United States Patent
Park et al.

(10) Patent No.: US 11,994,690 B2
(45) Date of Patent: May 28, 2024

(54) DIFFRACTIVE LIGHT GUIDE PLATE AND DISPLAY DEVICE COMPRISING SAME

(71) Applicant: LG CHEM, LTD., Seoul (KR)

(72) Inventors: Seong Min Park, Daejeon (KR); Jeong Ho Park, Daejeon (KR); Sang Choll Han, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 303 days.

(21) Appl. No.: 17/435,600

(22) PCT Filed: Apr. 1, 2020

(86) PCT No.: PCT/KR2020/004442
§ 371 (c)(1),
(2) Date: Sep. 1, 2021

(87) PCT Pub. No.: WO2020/204590
PCT Pub. Date: Oct. 8, 2020

(65) Prior Publication Data
US 2022/0155511 A1 May 19, 2022

(30) Foreign Application Priority Data

Apr. 1, 2019 (KR) .................. 10-2019-0038030
Mar. 27, 2020 (KR) .................. 10-2020-0037546

(51) Int. Cl.
*G02B 27/42* (2006.01)
*F21V 8/00* (2006.01)
(Continued)

(52) U.S. Cl.
CPC ....... *G02B 27/4272* (2013.01); *G02B 5/1866* (2013.01); *G02B 6/005* (2013.01);
(Continued)

(58) Field of Classification Search
CPC ............ G02B 27/0081; G02B 27/0172; G02B 5/1866; G02B 6/0016; G02B 6/005; G02B 27/4272; G02B 2027/0123; G02B 27/4205
See application file for complete search history.

(56) References Cited

U.S. PATENT DOCUMENTS 6,580,529 B1   6/2003  Amitai et al.
8,160,411 B2   4/2012  Levola et al.
(Continued)

FOREIGN PATENT DOCUMENTS

CN      106575034 A    4/2017
JP      2017528739 A   9/2017
(Continued)

*Primary Examiner* — Michelle R Connelly
(74) *Attorney, Agent, or Firm* — Bryan Cave Leighton Paisner LLP

(57) ABSTRACT

A diffractive light guide plate and a display device including the same, the diffractive light guide plate including a light guide unit; a first diffractive optical element including a linear grating repeatedly formed at a predetermined pitch; and a second diffractive optical element disposed in a region distinct from a region where the first diffractive optical element is disposed and including a two-dimensional pattern provided in a region where a virtual first linear pattern repeatedly arranged at a predetermined pitch along a first direction and a virtual second linear pattern repeatedly arranged at a predetermined pitch along a second direction intersect each other, where a horizontal section of the two-dimensional pattern has an elliptical shape and an angle between the long axis of the elliptical shape and a direction perpendicular to an extension direction of the linear grating in the first diffractive optical element is less than 20°.

7 Claims, 24 Drawing Sheets

(51) Int. Cl.
  *G02B 5/18*   (2006.01)
  *G02B 27/00*  (2006.01)
  *G02B 27/01*  (2006.01)

(52) U.S. Cl.
  CPC ....... *G02B 6/0058* (2013.01); *G02B 27/0081* (2013.01); *G02B 27/0172* (2013.01); *G02B 27/42* (2013.01); *G02B 27/4205* (2013.01); *G02B 6/0016* (2013.01); *G02B 2027/0123* (2013.01)

(56) References Cited

U.S. PATENT DOCUMENTS

| | | | |
|---|---|---|---|
| 2016/0363728 A1* | 12/2016 | Wang | G01N 21/03 |
| 2017/0102543 A1 | 4/2017 | Vallius | |
| 2018/0059304 A1* | 3/2018 | Bhargava | G02B 5/3025 |
| 2018/0074340 A1 | 3/2018 | Robbins et al. | |
| 2018/0374266 A1 | 12/2018 | Schowengerdt et al. | |

FOREIGN PATENT DOCUMENTS

| | | | | |
|---|---|---|---|---|
| KR | 10-2014-0049863 A | 4/2014 | | |
| KR | 10-2015-0072407 A | 6/2015 | | |
| KR | 10-2017-0039655 A | 4/2017 | | |
| KR | 10-2019-0015507 A | 2/2019 | | |
| KR | 10-2019-0082303 A | 7/2019 | | |
| WO | 2018-231754 A | 12/2018 | | |
| WO | WO-2018231754 A1 * | 12/2018 | ......... | G02B 27/0081 |

\* cited by examiner

[Fig. 1]
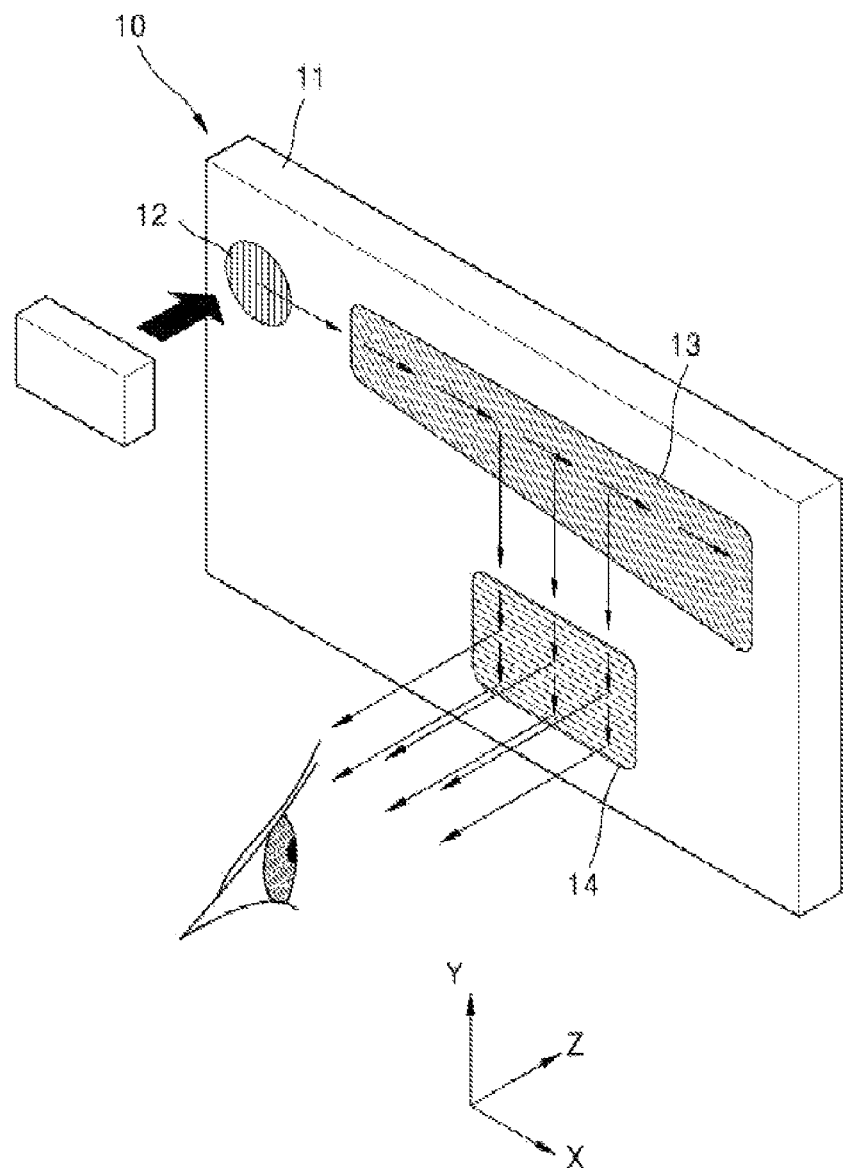
Related Art

[Fig. 2]
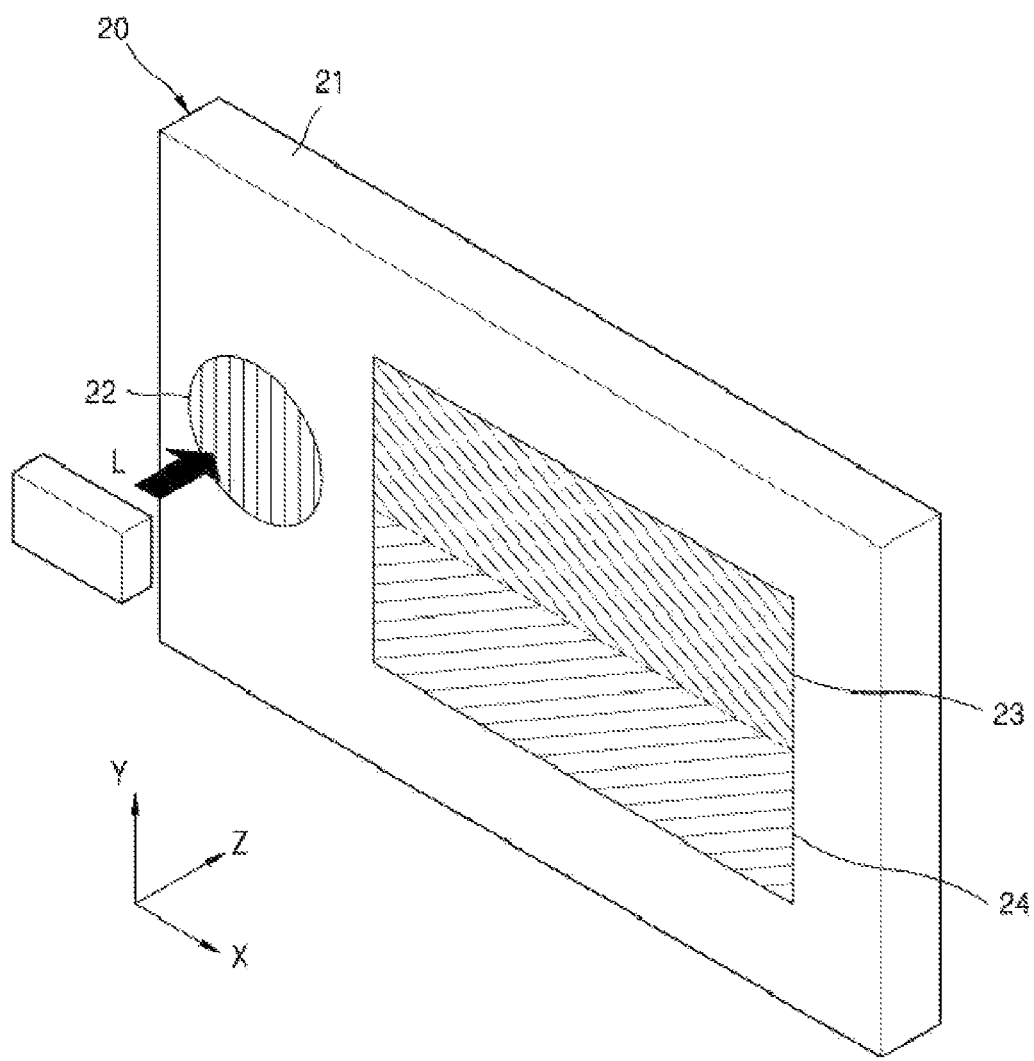
Related Art

[Fig. 3a]
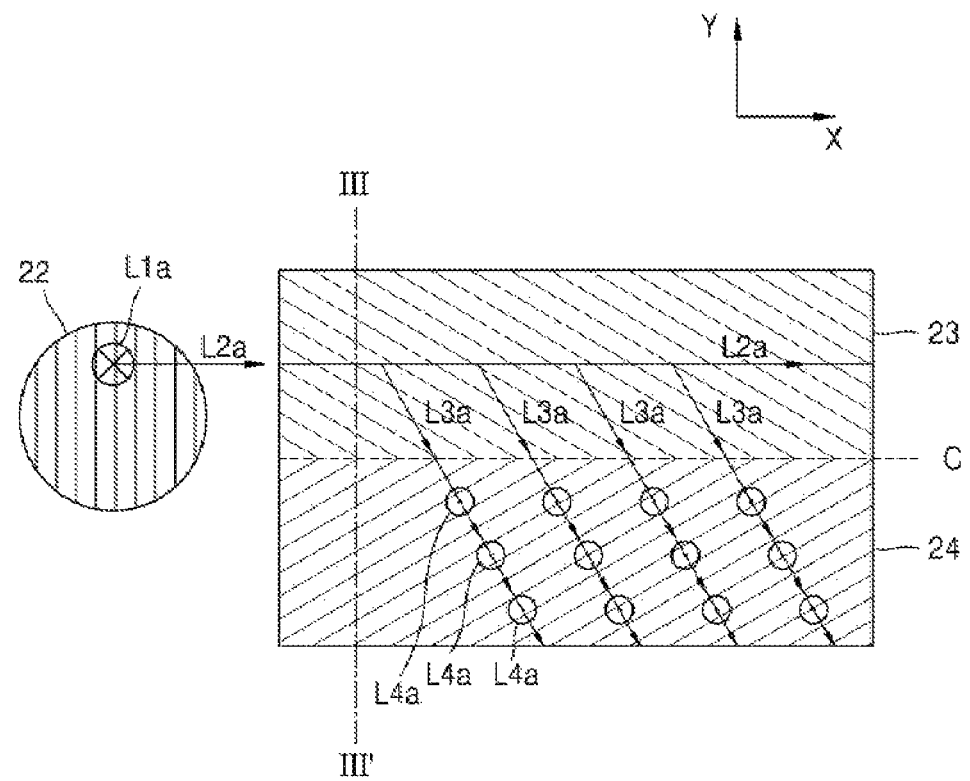
Related Art

[Fig. 3b]
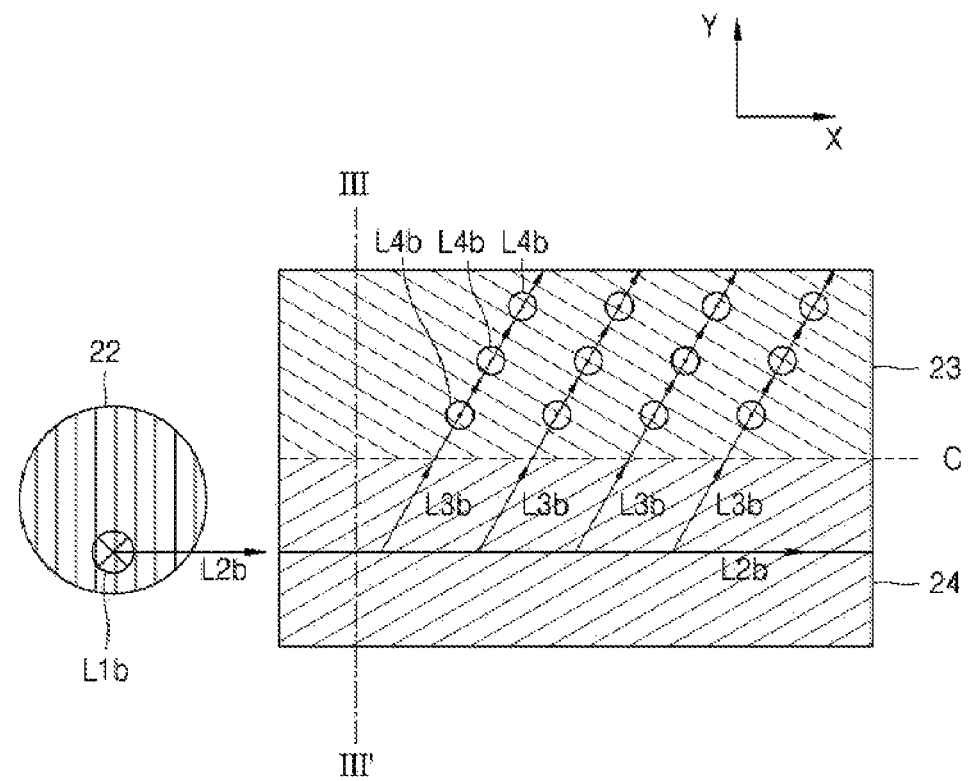
Related Art

[Fig. 4]
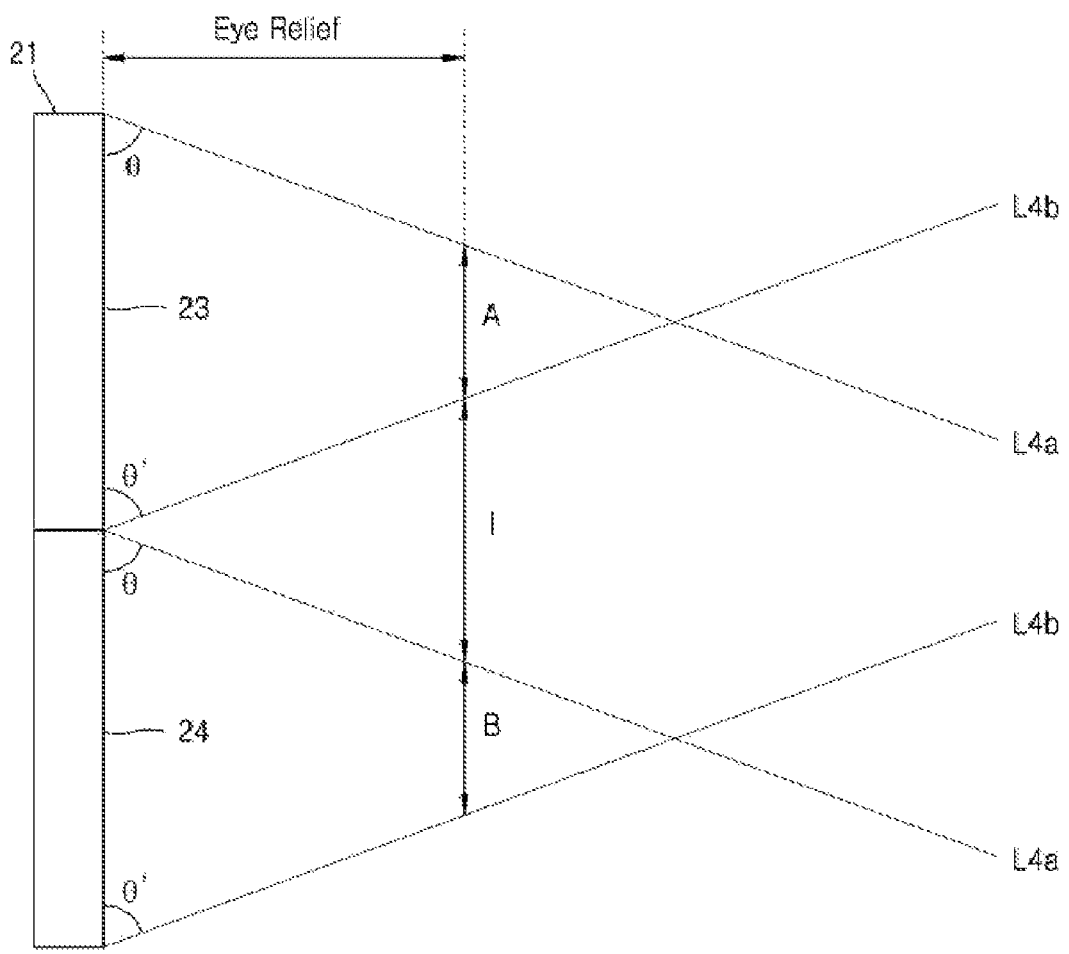
Related Art

[Fig. 5]
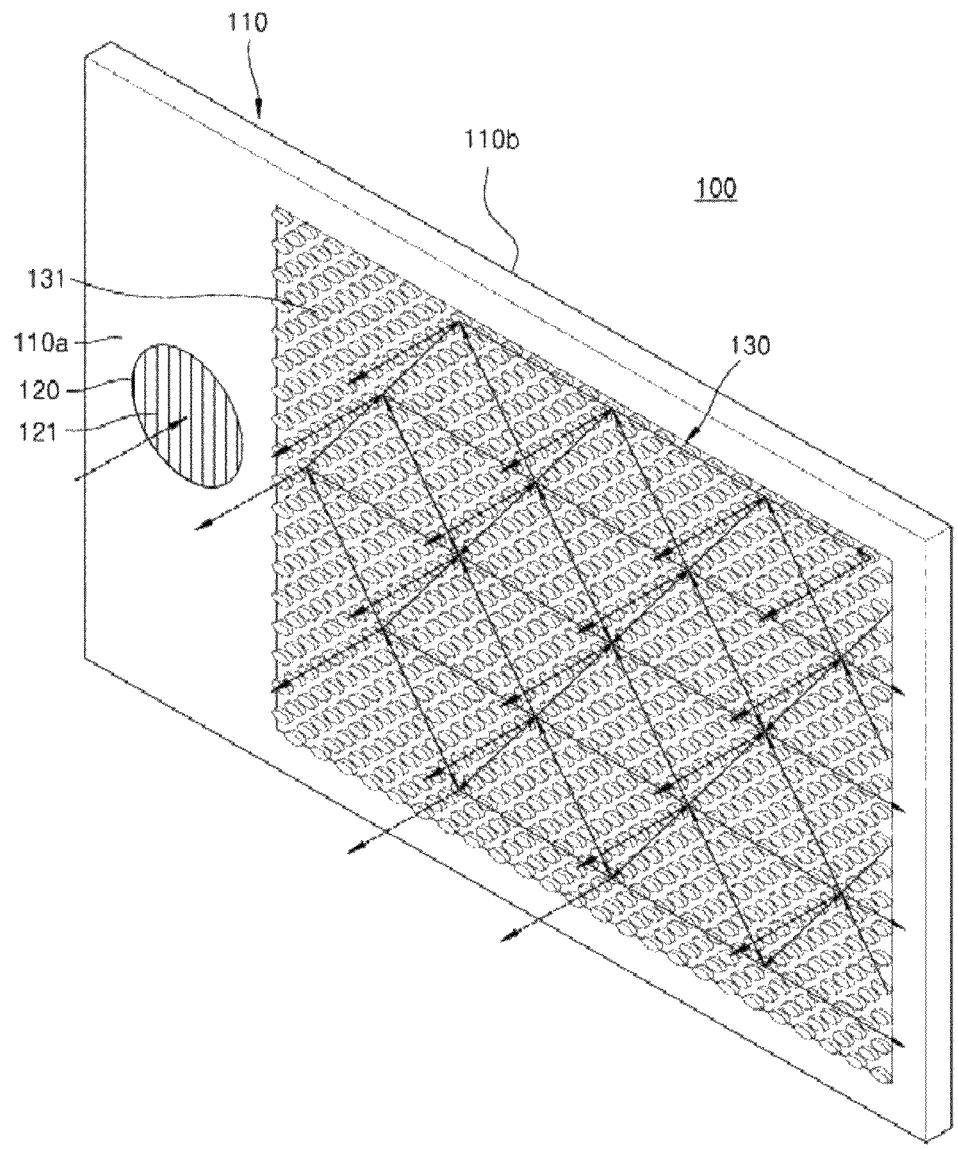

[Fig. 6]
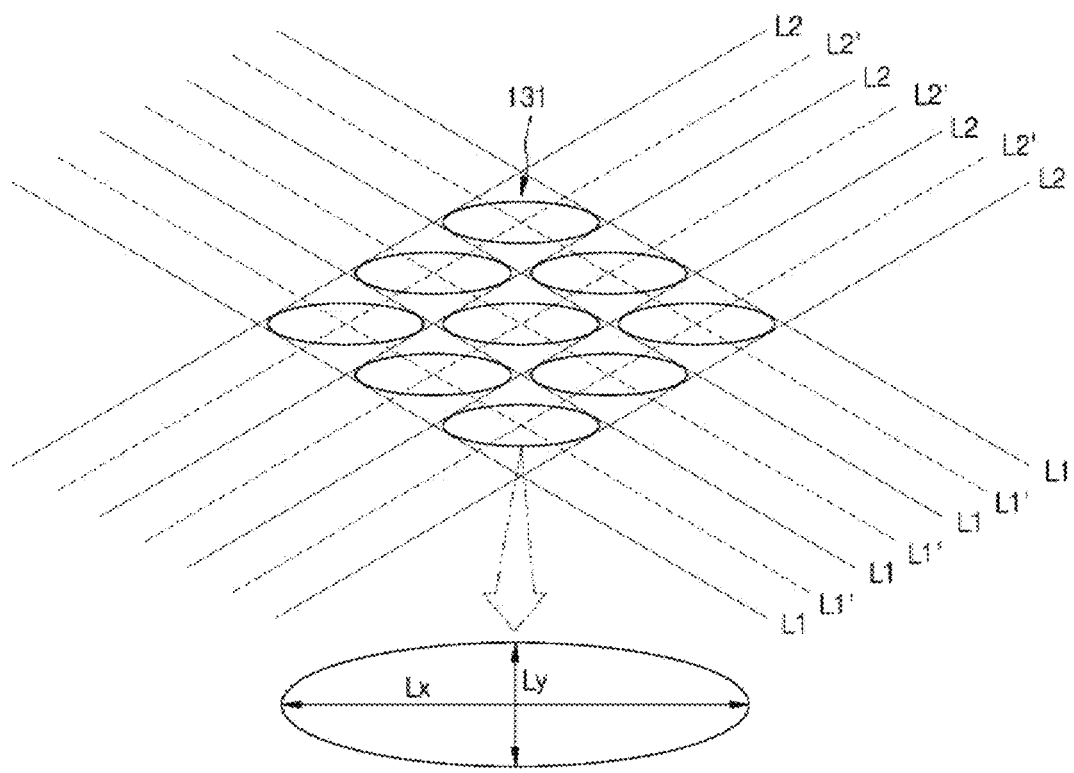

[Fig. 7a]
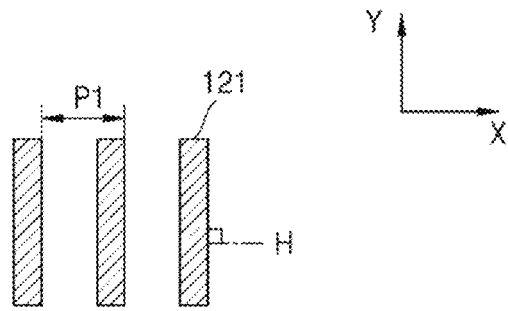
[Fig. 7b]
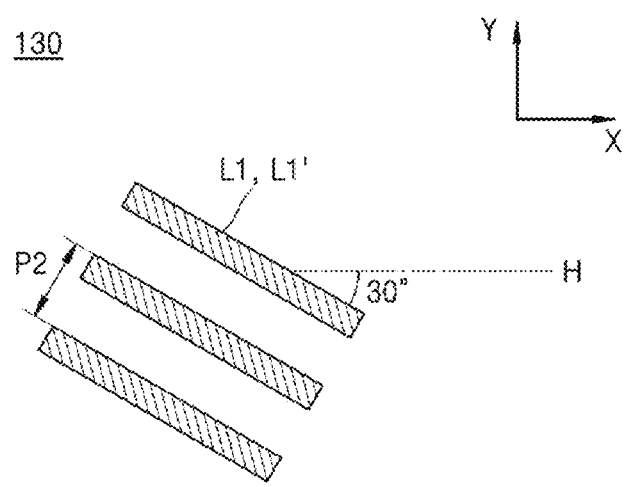

[Fig. 7c]
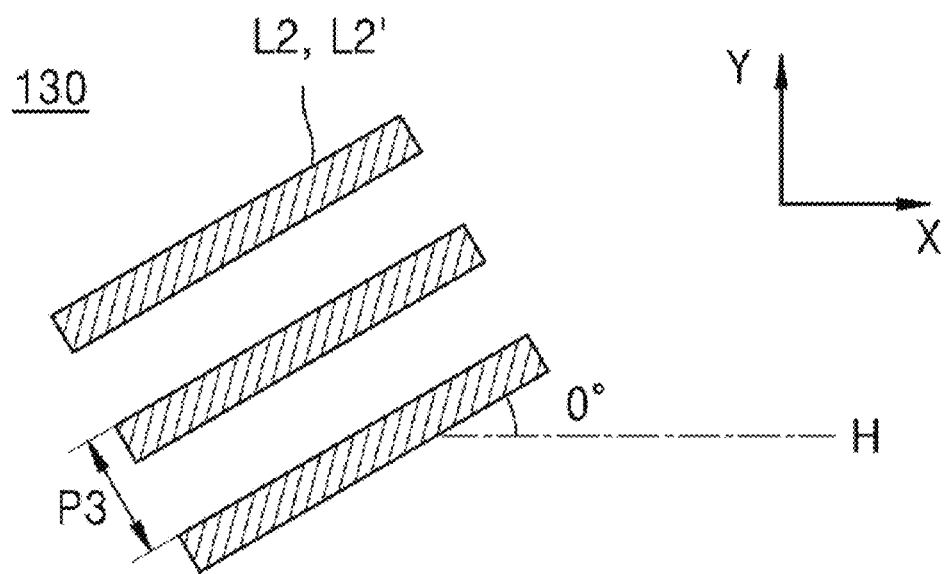
[Fig. 8]
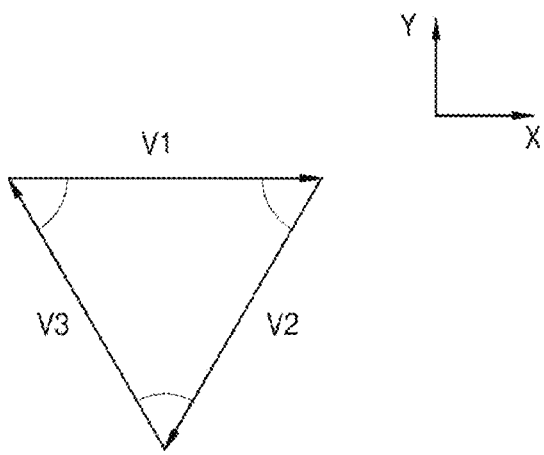

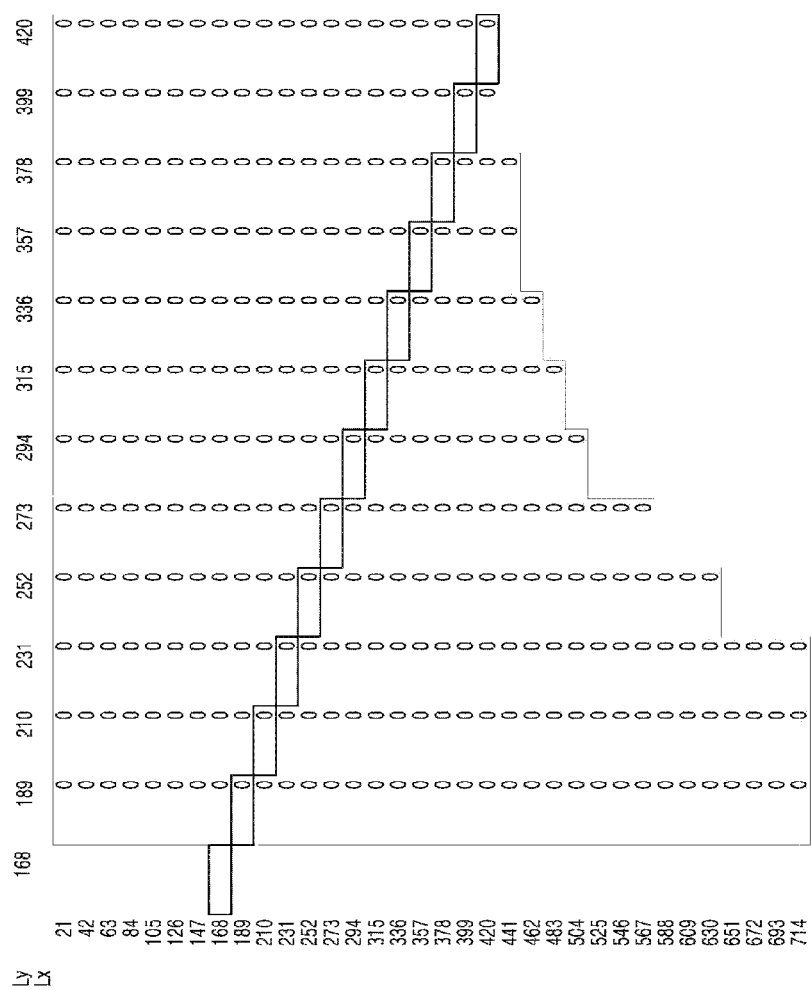
[Fig. 9a]

[Fig. 9b]
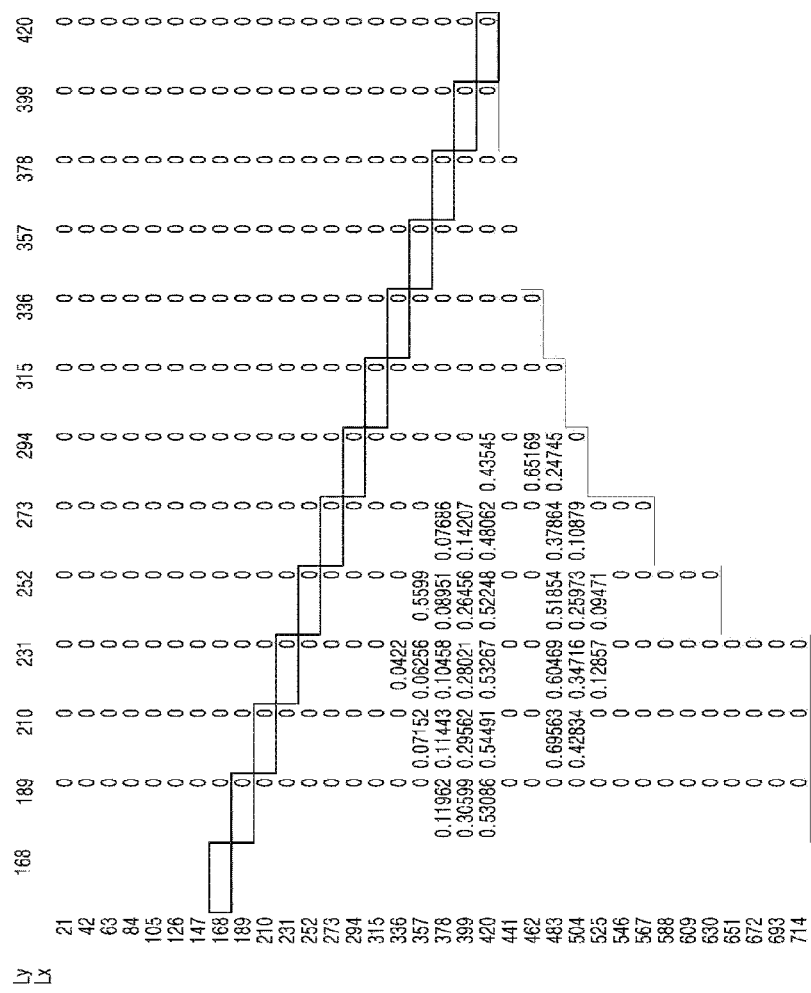

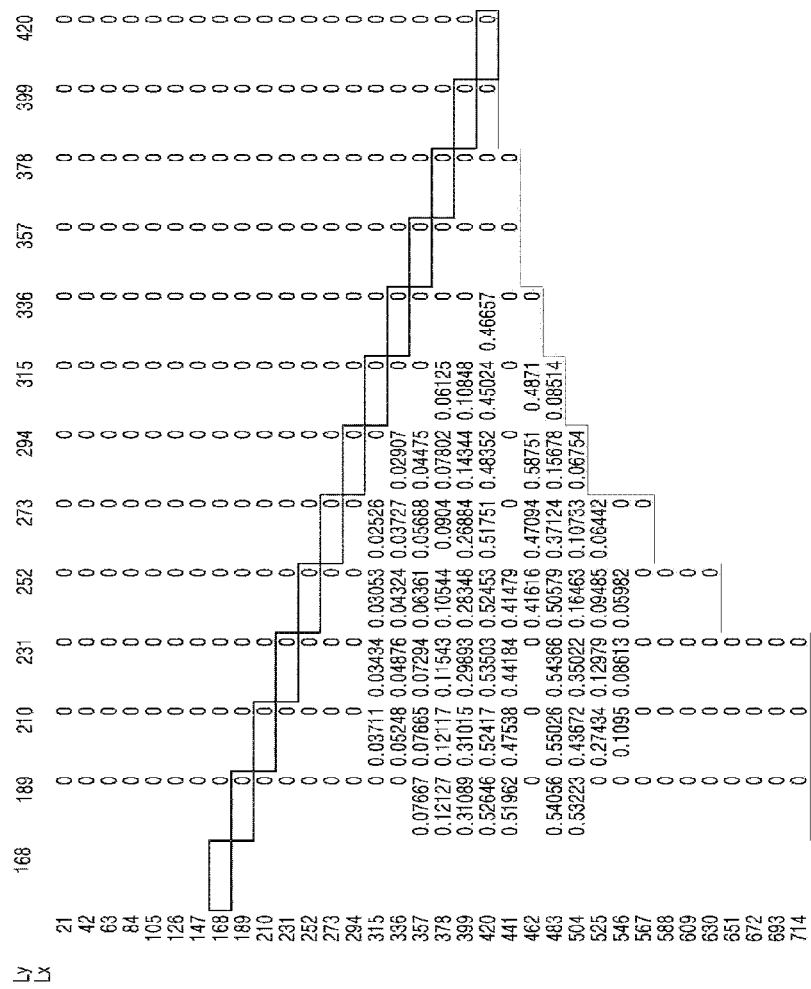
[Fig. 9c]

[Fig. 9d]
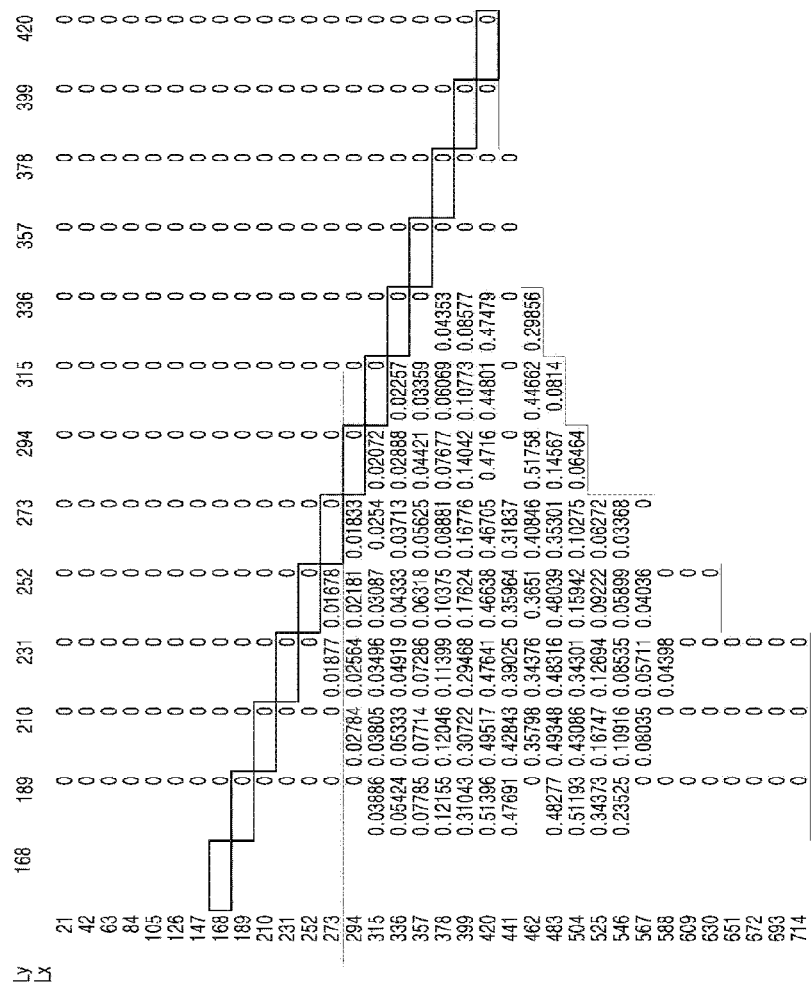

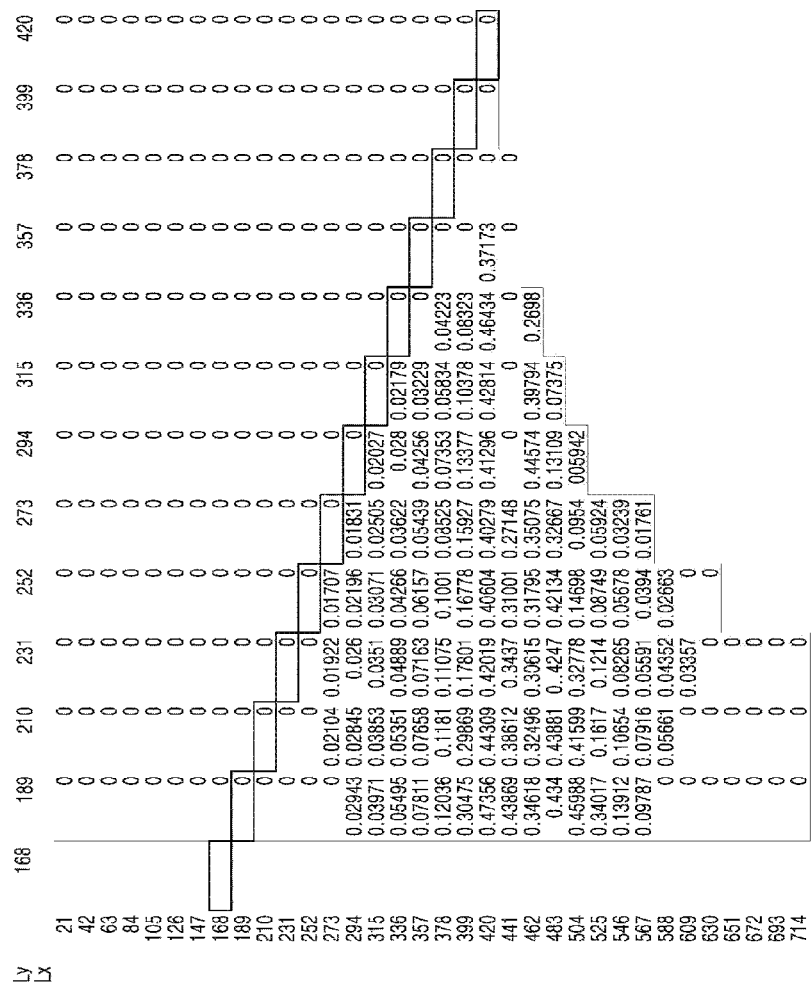
[Fig. 9e]

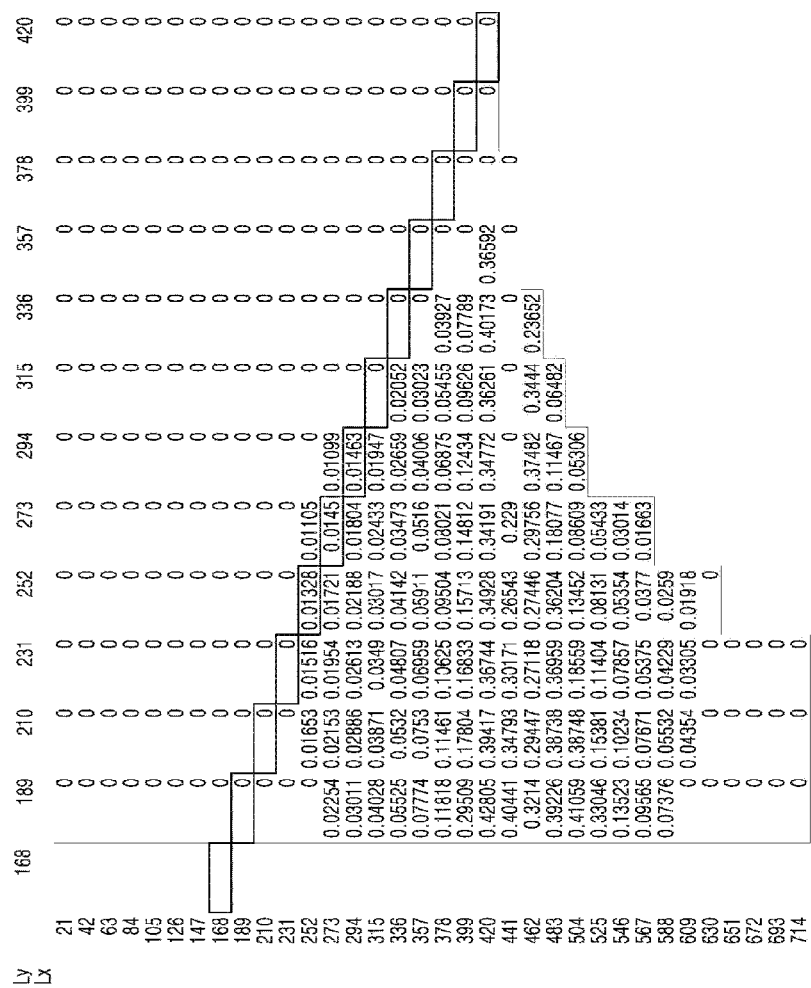
[Fig. 9f]

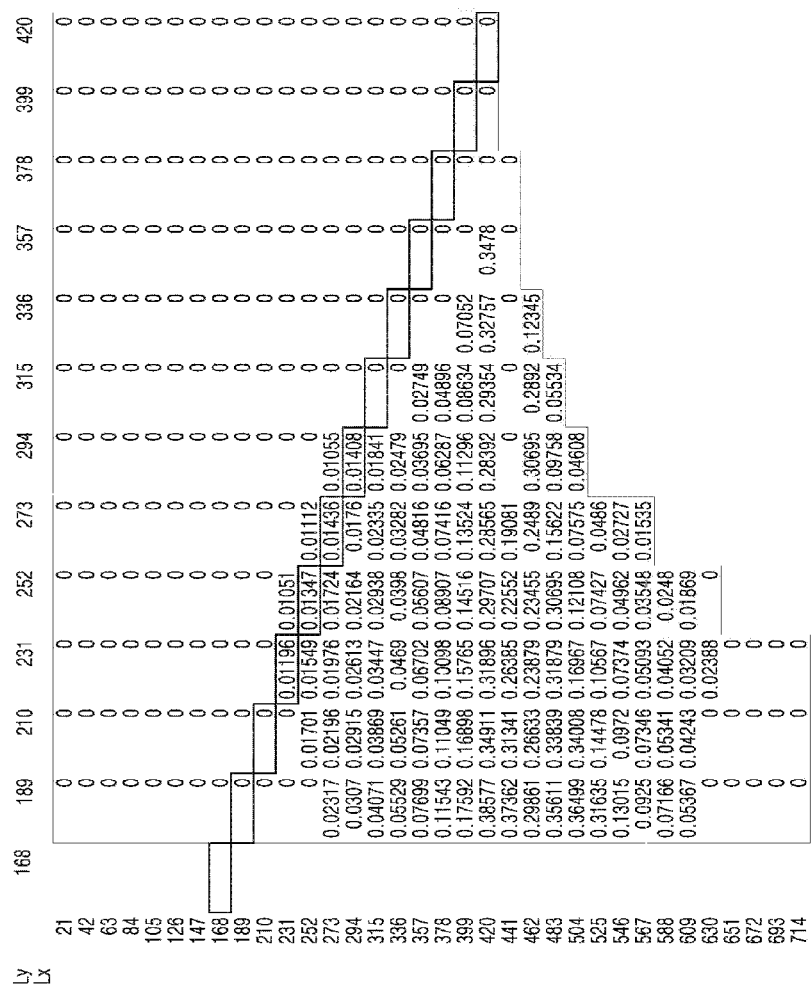
[Fig. 9g]

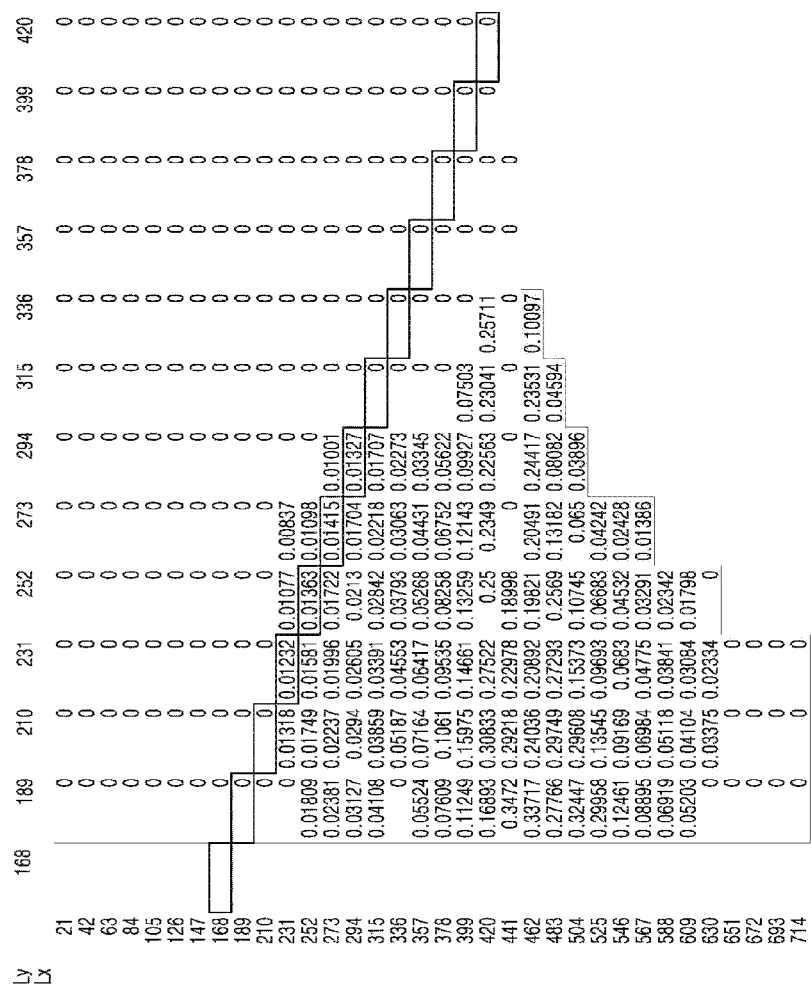
[Fig. 9h]

[Fig. 9i]
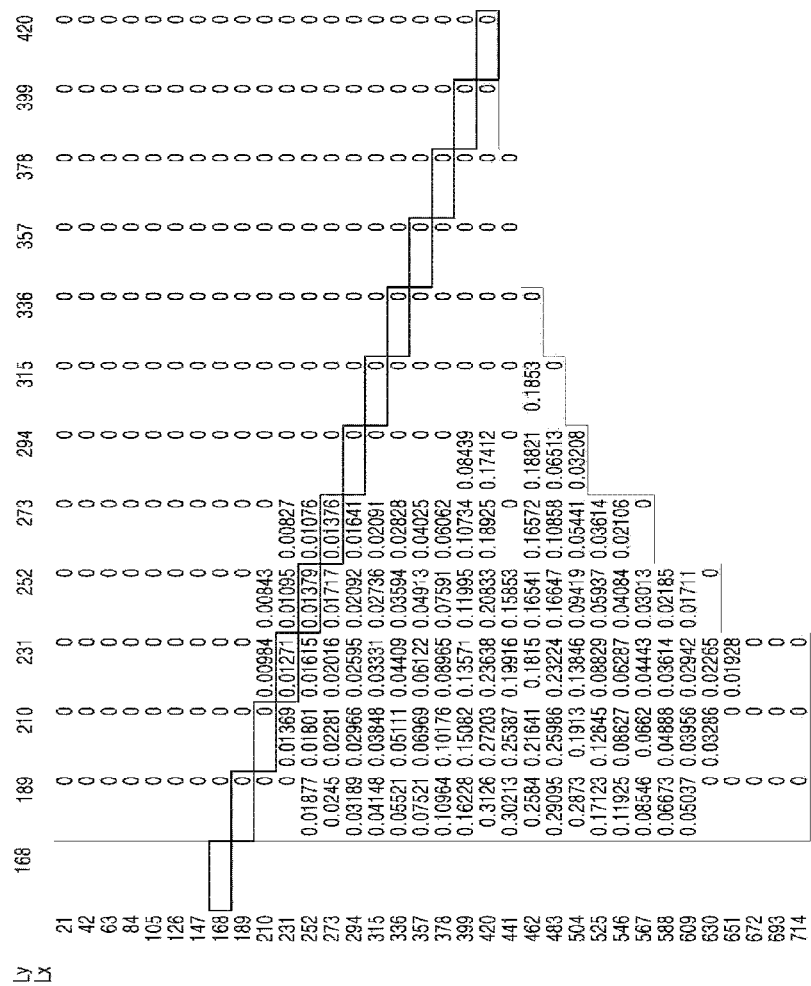

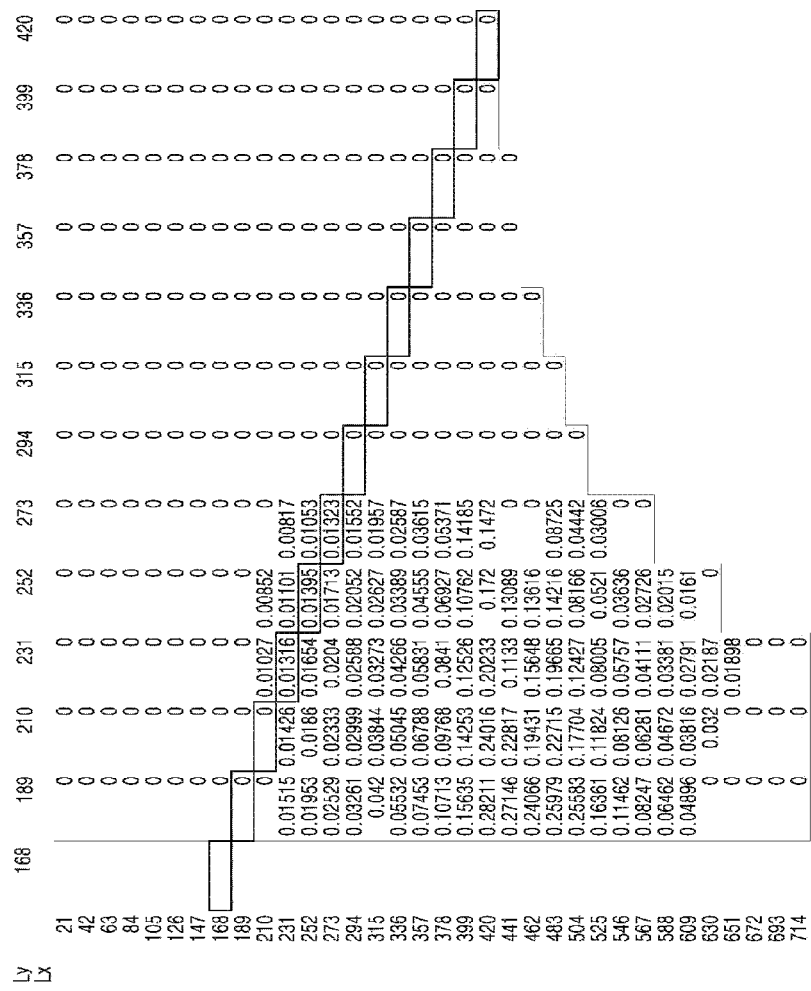
[Fig. 9j]

[Fig. 9k]
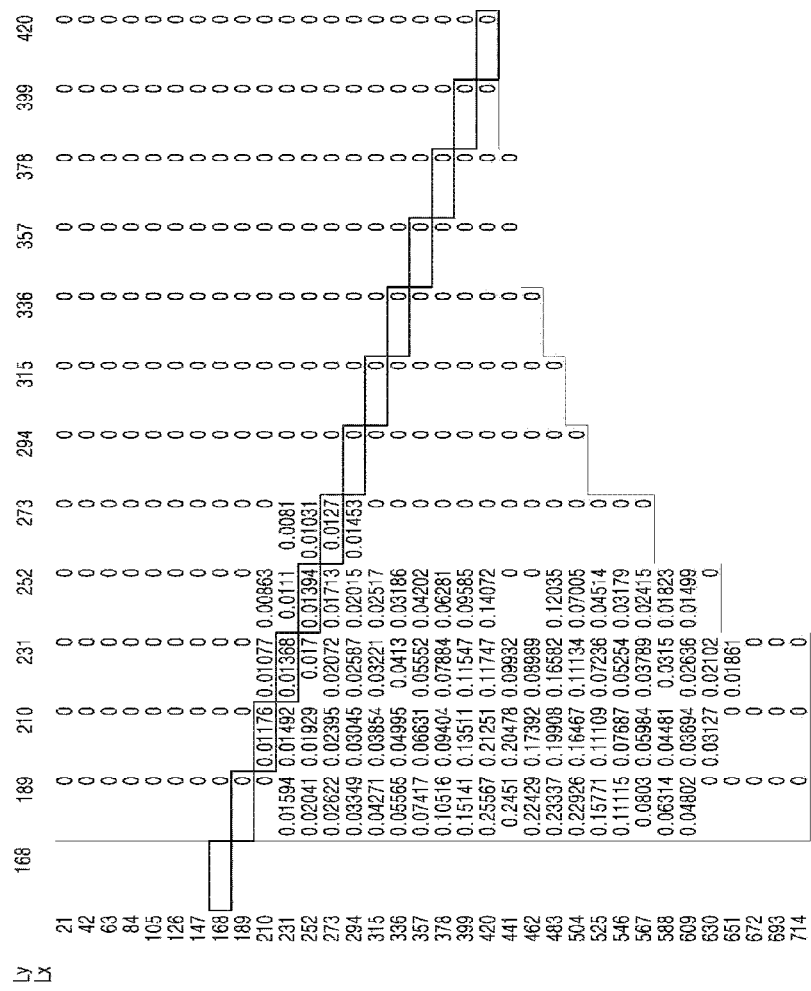

[Fig.91]

| Uniformity | 189 | 210 | 231 | 252 | 273 | 294 | 315 |
|---|---|---|---|---|---|---|---|
| 336 | 0 | 0.0485 | 0.04608 | 0.04136 | 0.03569 | 0 | 0 |
| 357 | 0 | 0.06962 | 0.0678 | 0.06001 | 0.05409 | 0.04271 | 0 |
| 378 | 0.10383 | 0.10773 | 0.10516 | 0.09774 | 0.08453 | 0.07315 | 0.05766 |
| 399 | 0.26246 | 0.27166 | 0.26797 | 0.26769 | 0.15677 | 0.13117 | 0.10064 |
| 420 | 0.43551 | 0.44909 | 0.46838 | 0.46439 | 0.4568 | 0.43036 | 0.3982 |
| 441 | 0.47852 | 0.46527 | 0.46391 | 0.44819 | 0.4199 | 0 | 0 |
| 462 | 0 | 0 | 0 | 0.42833 | 0.4863 | 0.56425 | 0.4769 |
| 483 | 0.46881 | 0.48302 | 0.49922 | 0.49355 | 0.37154 | 0.24557 | 0 |
| 504 | 0 | 0.40301 | 0.33619 | 0.26051 | 0.10707 | 0 | 0 |
| 525 | 0 | 0.25247 | 0.12435 | 0.09454 | 0.06367 | 0 | 0 |

[Fig. 9m]

| Uniformity | 189 | 210 | 231 | 252 | 273 | 294 | 315 |
|---|---|---|---|---|---|---|---|
| 336 | 0.04529 | 0.04558 | 0.04297 | 0.03855 | 0.03345 | 0.02627 | 0 |
| 357 | 0.06298 | 0.06418 | 0.06205 | 0.05511 | 0.04964 | 0.03946 | 0 |
| 378 | 0.09451 | 0.09661 | 0.09409 | 0.08759 | 0.07611 | 0.06616 | 0.05263 |
| 399 | 0.23254 | 0.14896 | 0.14744 | 0.14262 | 0.13591 | 0.11498 | 0.08961 |
| 420 | 0.37132 | 0.37976 | 0.39445 | 0.39096 | 0.38496 | 0.3623 | 0.32005 |
| 441 | 0.4458 | 0.45472 | 0.46905 | 0.48986 | 0.5047 | 0.51604 | 0.54704 |
| 462 | 0.43033 | 0.42138 | 0.42145 | 0.45527 | 0.51648 | 0.54233 | 0.44833 |
| 483 | 0.43585 | 0.4535 | 0.47784 | 0.49974 | 0.39151 | 0.25087 | 0 |
| 504 | 0.43418 | 0.40226 | 0.34593 | 0.27815 | 0.11597 | 0 | 0 |
| 525 | 0 | 0.25775 | 0.13079 | 0.10233 | 0.06863 | 0 | 0 |

[Fig. 9n]

| Uniformity | 189 | 210 | 231 | 252 | 273 | 294 | 315 |
|---|---|---|---|---|---|---|---|
| 336 | 0 | 0 | 0 | 0 | 0 | 0 | 0 |
| 357 | 0 | 0 | 0 | 0 | 0 | 0 | 0 |
| 378 | 0 | 0 | 0 | 0 | 0 | 0 | 0 |
| 399 | 0 | 0 | 0 | 0 | 0 | 0 | 0 |
| 420 | 0 | 0 | 0 | 0 | 0 | 0 | 0 |
| 441 | 0 | 0 | 0 | 0 | 0 | 0 | 0 |
| 462 | 0 | 0 | 0 | 0 | 0 | 0 | 0 |
| 483 | 0 | 0 | 0 | 0 | 0 | 0 | 0 |
| 504 | 0 | 0 | 0 | 0 | 0 | 0 | 0 |
| 525 | 0 | 0 | 0 | 0 | 0 | 0 | 0 |

[Fig. 10a]
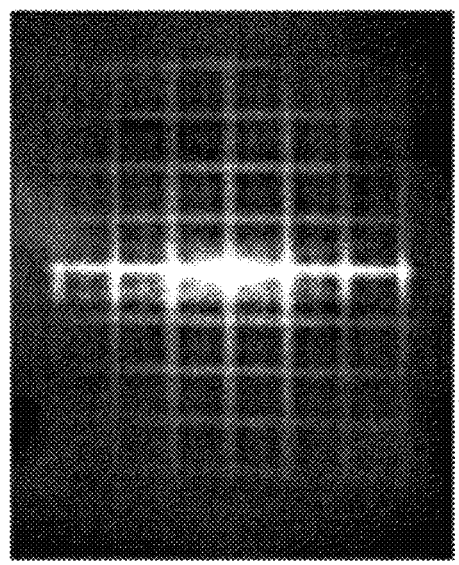
[Fig. 10b]
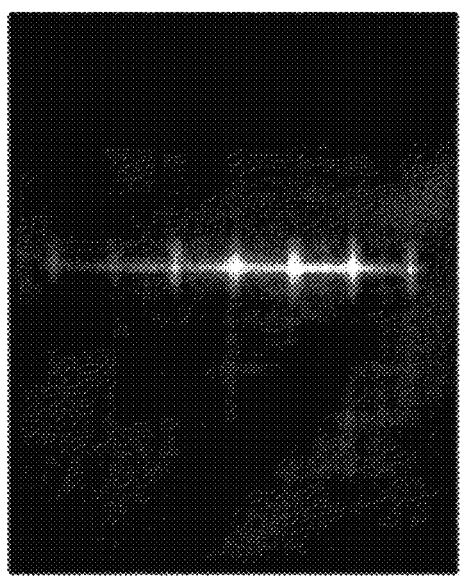

DIFFRACTIVE LIGHT GUIDE PLATE AND DISPLAY DEVICE COMPRISING SAME

CROSS-REFERENCE TO RELATED APPLICATIONS

This application is a National Stage Application of International Application No. PCT/KR2020/004442 filed on Apr. 1, 2020, which claims priority to Korean Patent Application No. 10-2019-0038030 filed on Apr. 1, 2019, and Korean Patent Application No. 10-2020-0037546 filed on Mar. 27, 2020, the disclosures of which are incorporated herein by reference in their entireties.

FIELD OF DISCLOSURE

The disclosure relates to a diffractive light guide plate and a display device including the same.

BACKGROUND

Recently, with an increase in interest in a display unit that implements augmented reality (AR), mixed reality (MR), or virtual reality (VR), research on the display unit that implements them has been actively conducted. The display unit for implementing the augmented reality, the mixed reality, or the virtual reality includes a diffractive light guide plate using a diffractive phenomenon based on the wave properties of light.

FIG. 1 is a view schematically illustrating a diffractive light guide plate 10 according to the related art.

Such a diffractive light guide plate 10 may include a light guide unit 11 and a plurality of diffractive optical elements 12 to 14 provided on one side or the other side of the light guide unit 11 and having a plurality of linear grating patterns. Specifically, the diffractive light guide plate 10 may include the input diffractive optical element 12, the intermediate diffractive optical element 13, and the output diffractive optical element 14. The input diffractive optical element 12 receives a light output through a micro light source output element P and allows the light to be guided on the light guide unit 11. The intermediate diffractive optical element 13 is optically coupled to the input diffractive optical element 12 through the light guide unit 11 and allows the light received from the input diffractive optical element 12 to be one-dimensionally extended in a first direction (an x-axis direction in FIG. 1) by diffraction. The output diffractive optical element 14 is optically coupled to the intermediate diffractive optical element 13 through the light guide unit 11 and allows the light received from the intermediate diffractive optical element 13 to be one-dimensionally extended in a second direction (a y-axis direction in FIG. 1) by diffraction such that the light is output from the light guide unit 11 toward a user's pupil.

Since the main optical path of the light output through the micro light source output element P to the user's pupil is in the order of the input diffractive optical element 12, the intermediate diffractive optical element 13, the output diffractive optical element 14, and the user's pupil, the size of an optical image output from the light guide unit 11 through the output diffractive optical element 14 depends on an area occupied by the output diffractive optical element 14.

In the case of the diffractive light guide plate according to the related art, the single input diffractive optical element 12, the single intermediate diffractive optical element 13, and the single output diffractive optical element 14 are disposed separately from one another on the light guide unit 11. Thus, the area occupied by the output diffractive optical element 14 on the light guide unit 11 is inevitably limited to an area excluding an area occupied by the input diffractive optical element 12 and the intermediate diffractive optical element 13 on the light guide unit 11, resulting in a limitation in outputting a larger optical image.

In order to solve such a limitation, a diffractive light guide plate 20 having a structure illustrated in FIG. 2 may be considered.

FIG. 2 illustrates a diffractive light guide plate 20 including a light guide unit 21, an input diffractive optical element 22, and two diffractive optical elements 23 and 24 having different linear grating patterns and coming into contact with each other.

FIG. 3a is a plan view schematically illustrating an example of an optical path formed through the diffractive light guide plate 20 illustrated in FIG. 2, and FIG. 3b is a plan view schematically illustrating another example of the optical path formed through the diffractive light guide plate illustrated in FIG. 2.

The light guide unit 21 guides lights in an interior by using total internal reflection.

The input diffractive optical element 22 may receive lights L, L1a, and L1b output from a light source and diffract the received lights L, L1a, and L1b to be guided on the light guide unit 21.

The two diffractive optical elements 23 and 24 may be configured to receive diffracted lights L2a and L2b and allow the received lights to be extended in one dimension by diffraction. A part of the diffracted lights L2a and L2b received from the input diffractive optical element 22 may be diffracted by passing through the diffractive optical elements 23 and 24 and thus have an optical path changed, and the rest thereof may be totally reflected to an existing optical path. The light initially received from the input diffractive optical element 22 may be divided into a plurality of beams L3a and L3b while being diffracted a plurality of times at a point spaced in a specific direction, and eventually extended in one dimension.

The diffractive optical element 23 may be configured to receive the extended light (beam L3b) from the other diffractive optical element 24 and allow the received light (beam L3b) to be output from the light guide unit 21 by diffraction, and the diffractive optical element 24 may be configured to receive the extended light (beam L3a) from the other diffractive optical element 23 and allow the received light (beam L3a) to be output from the light guide unit 21 by diffraction. Furthermore, the diffractive optical element 23 may receive the extended light (beam L3b) from the other diffractive optical element 24 and extend the received light in one dimension by diffraction, and the diffractive optical element 24 may receive the extended light (beam L3a) from the other diffractive optical element 23 and extend the received light in one dimension by diffraction. In such a case, the direction, in which the plurality of beams L3b and L3a formed by the lights extended by the diffractive optical elements 24 and are spaced apart from each other based on a light receiving side C of each of the two diffractive optical elements 23 and 24, intersects the direction in which a plurality of beams L4b and L4a extended by the two diffractive optical elements 23 and 24 are spaced apart from each other based on the single beams L3b and L3a. Therefore, two-dimensional extension is achieved based on the lights L1a and L1b received by the input diffractive optical element 22 from the light source.

The diffractive optical element 23 may be configured such that the light receiving side C receiving the extended light (beam L3b) from the other diffractive optical element is in contact with the light receiving side C of the diffractive optical element 24, and the diffractive optical element 24 may be configured such that the light receiving side C receiving the extended light (beam L3a) from the other diffractive optical element 23 is in contact with the light receiving side C of the diffractive optical element 23. The lights output from the light source are output from the light guide unit 21 via the input diffractive optical element 22, the two diffractive optical elements 23 and 24, and the other diffractive optical elements 24 and 23. Thus, the lights output from the light guide unit 21 may be collected by the diffractive optical elements 24 and 23, respectively, to form one image light.

That is, the two diffractive optical elements 23 and 24 are all used as output diffractive optical elements, so that it is possible to form an image light having a wider viewing angle while efficiently using a space, as compared with the case of using the single output diffractive optical element as illustrated in FIG. 1.

FIG. 4 is a sectional view of the diffractive light guide plate illustrated in FIG. 3a and/or illustrated in FIG. 3b, which is taken along line III-III'.

The lights diffracted through the two diffractive optical elements 23 and 24 and output from the light guide unit 21 may be output at predetermined exit angles θ and θ' with respect to one surface of the light guide unit 21, respectively. In FIG. 4, the light (beam L4a) diffracted and output by the diffractive optical element 23 located on an upper side may be output inclined downward at the predetermined exit angle θ with respect to one surface of the light guide unit 21, and the light (beam L4b) diffracted and output by the diffractive optical element 24 located on a lower side may be output inclined upward at the predetermined exit angle θ' with respect to one surface of the light guide unit 21.

At a position spaced apart from one surface of the light guide unit 21 by a predetermined distance, the light (Beam L4a) diffracted and output by the diffractive optical element 23 located on the upper side and the light (beam L4b) diffracted and output by the diffractive optical element 24 located on the lower side form intersection regions I intersecting each other. In a case where a distance spaced apart from one surface of the light guide unit 21 is a distance corresponding to an eye relief where the user's pupil is located, only when the user's pupil is located in the intersection region I, the user can visually recognize a normal image light without a dark part of the entire area. When the user's pupil is located in a region A located above the intersection region I, the light L4b diffracted and output by the diffractive optical element 24 located on the lower side may not be visually recognizable by the user. Thus, a lower portion of the image light visually recognized by the user may appear dark on the basis of the cross-section of the line III-III'. On the other hand, when the user's pupil is located in a region B located below the intersection region I, the light (Beam L4a) diffracted and output by the diffractive optical element 23 located on the upper side may not be visually recognizable by the user. Thus, an upper portion of the image light visually recognized by the user may appear dark on the basis of the cross-section of the line III-III'.

Pupils of users using a display unit including the diffractive light guide plate may be variously located on the basis of the vertical direction on one side of the light guide unit due to individual physical characteristics of the users. Therefore, it is necessary to provide a structure of a diffractive light guide plate in which an intersection region I related to an eye motion box, which is a region where a normal image light can be visually recognized, can be formed to elongate vertically.

Since the related art described above is technical information possessed by the inventor for deriving embodiments of the present disclosure or acquired in the process of deriving embodiments of the present disclosure, it may not be necessarily said that the related art is a publicly known technique disclosed to the general public before filing the application for the present disclosure.

SUMMARY

Technical Problem

Embodiments of the present disclosure provide a diffractive light guide plate capable of providing wide viewing angle and large eye motion box, and a display device including the same.

Problems to be solved by the present disclosure are not limited to the aforementioned problems, and the other unmentioned problems will be clearly understood by those skilled in the art from the following description.

Technical Solution

An embodiment according to an aspect of the present disclosure provides a diffractive light guide plate including a light guide unit configured to guide lights; a first diffractive optical element including a linear grating repeatedly formed at a predetermined pitch such that lights output from a light source are received and guided on the light guide unit, and configured to diffract the received lights; and a second diffractive optical element disposed in a region distinct from a region where the first diffractive optical element is disposed on one surface of the light guide unit, and including a two-dimensional pattern provided in a region where a virtual first linear pattern repeatedly arranged at a predetermined pitch along a first direction and a virtual second linear pattern repeatedly arranged at a predetermined pitch along a second direction different from the first direction intersect each other, wherein a horizontal section of the two-dimensional pattern has an elliptical shape and an angle formed between the long axis of the elliptical shape and a direction perpendicular to an extension direction of the linear grating included in the first diffractive optical element is less than 20°.

In the present embodiment, the two-dimensional pattern may protrude from the one surface of the light guide unit.

In the present embodiment, a protruding height of the two-dimensional pattern may be 0.084 times to 0.113 times a wavelength of the light output from the light source.

In the present embodiment, the short axis of the elliptical shape may be 0.50 times to 0.921 times a pitch of the linear grating and the linear pattern.

In the present embodiment, the long axis of the elliptical shape may be 0.150 times to 1.324 times the pitch of the linear grating and the linear pattern.

In the present embodiment, each of the linear grating and the linear pattern may have a grating vector defined by a size inversely proportional to each pitch thereof and a direction perpendicular to a direction in which the linear grating and the linear pattern are extended, and the sum of grating vectors of the linear grating of the first diffractive optical element and the first linear pattern and the second linear pattern of the second diffractive optical element may have a value of 0.

In the present embodiment, the grating vectors of the linear grating of the first diffractive optical element and the first linear pattern and the second linear pattern of the second diffractive optical element may have the same size.

In the present embodiment, the grating vectors of the linear grating of the first diffractive optical element and the first linear pattern and the second linear pattern of the second diffractive optical element may form an angle of 60° therebetween.

An embodiment according to another aspect of the present disclosure provides a display device including: a light source configured to output an image light that forms an image; and the diffractive light guide plate according to an aspect of the present disclosure.

Advantageous Effects

According to embodiments of the present disclosure, it is possible to provide wide viewing angle and large eye motion box, and thereby extensively respondable to pupils of users with various physical conditions, because a light received from the first diffractive optical element by each of a first grating and a second grating each composed of the two-dimensional pattern disposed over the entire region of the second diffractive optical element is extended and the extended image light is output.

BRIEF DESCRIPTION OF DRAWINGS

FIG. 1 is a view schematically illustrating a diffractive light guide plate according to the related art.

FIG. 2 is a view illustrating a diffractive light guide plate including a light guide unit, an input diffractive optical element, and two diffractive optical elements having different linear grating patterns and coming into contact with each other.

FIG. 3a is a plan view schematically illustrating an example of an optical path formed through the diffractive light guide plate illustrated in FIG. 2.

FIG. 3b is a plan view schematically illustrating another example of the optical path formed through the diffractive light guide plate illustrated in FIG. 2.

FIG. 4 is a sectional view of the diffractive light guide plate illustrated in FIG. 3a and/or illustrated in FIG. 3b, which is taken along line III-III'.

FIG. 5 is a view schematically illustrating a diffractive light guide plate according to an aspect of the present disclosure.

FIG. 6 is a view illustrating a part of a region of a second diffractive optical element of the diffractive light guide plate illustrated in FIG. 5.

FIG. 7a is a plan view of a linear grating included in a first diffractive optical element, FIG. 7b is a plan view of a first linear pattern on the second diffractive optical element, and FIG. 7c is a plan view of a second linear pattern on the second diffractive optical element.

FIG. 8 is a view illustrating a combination of grating vectors of the linear grating of the first diffractive optical element and the first linear pattern and the second linear pattern of the second diffractive optical element, which are included in the diffractive light guide plate according to an aspect of the present disclosure.

FIGS. 9a to 9k are views illustrating uniformity of light amount distribution based on simulation results of lights output according to the horizontal and vertical lengths and the protruding height of a two-dimensional pattern in a predetermined region of the second diffractive optical element.

FIGS. 9l to 9n are views illustrating uniformity of light amount distribution based on simulation results of lights output according to a direction of the horizontal length of the two-dimensional pattern in a predetermined region of the second diffractive optical element.

FIG. 10a is an image obtained by capturing a light output from the second diffractive optical element of an embodiment of the diffractive light guide plate according to an aspect of the present disclosure, and FIG. 10b is an image obtained by capturing a light output from a second diffractive optical element of a comparative example of a diffractive light guide plate having a circular horizontal section of a two-dimensional pattern.

DETAILED DESCRIPTION

The present disclosure will become apparent by reference to the following detailed description in conjunction with the accompanying drawings. However, the scope of the present disclosure is not limited to such embodiments and the present disclosure may be realized in various forms. The embodiments to be described below are nothing but the ones provided to bring the disclosure of the present disclosure to perfection and assist those skilled in the art to completely understand the scope of the present disclosure in the technical field to which the present disclosure pertains. The present disclosure is defined only by the scope of the appended claims. The terminology used herein is for the purpose of describing embodiments only and is not intended to limit the present disclosure. As used herein, the singular forms "a", "an" and "the" are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements. The terms such as first and second may be used to describe various components, but the components are not limited by the terms. The terms are used only to distinguish one component from another component.

In the present specification, the term "light guide unit" may be defined as a structure for guiding lights in an interior by using total internal reflection. The condition for the total internal reflection is that the refractive index of the light guide unit needs to be larger than that of a surrounding medium adjacent to the surface of the light guide unit. The light guide unit may be formed of a glass and/or plastic material and may be transparent or translucent. The light guide unit may be formed in various layouts in a plate type. The term "plate" means a three-dimensional structure having a predetermined thickness between one surface and the other surface on the opposite side thereto, and the one surface and the other surface may be substantially flat planes, but at least one of the one surface and the other surface may be formed to be curved in one dimension or two dimensions. For example, the plate-type light guide unit may be curved in one dimension, so that one surface and/or the other surface thereof may have a shape corresponding to some of side surfaces of a cylinder. However, preferably, a curvature formed by its curving has a radius of curvature large enough to facilitate total internal reflection in order to guide lights on the light guide unit.

In the present specification, the term "diffractive optical element" may be defined as a structure for changing an optical path by diffracting lights on the light guide unit. The "diffractive optical element" may indicate a part in which linear gratings aligned in one direction on the light guide unit are arranged in a predetermined direction to form a predetermined area while having a pattern. As another example, the "diffractive optical element" may indicate a part in which protruding patterns protruding from one surface of the light guide unit or concave patterns recessed in the one surface are arranged with a predetermined rule to form a predetermined region.

In the present specification, the term "linear grating" may indicate a protrusion shape (that is, an embossed pattern) having a predetermined height on the surface of the light guide unit and/or a groove shape (that is, an intaglio pattern) having a predetermined depth in the surface of the light guide unit. The alignment direction of the linear gratings may be freely designed such that the optical path can be changed in an intended direction through diffraction by the diffractive optical element.

Referring to FIG. 5 to FIG. 8, a diffractive light guide plate 100 may include a light guide unit 110, a first diffractive optical element 120, and a second diffractive optical element 130.

The light guide unit 110 may guide lights in an interior by using total internal reflection.

The first diffractive optical element 120 may receive lights output from a light source and diffract the received lights to be guided on the light guide unit 110. Such a first diffractive optical element 120 may include linear gratings 121 repeatedly formed at a predetermined pitch.

Such a first diffractive optical element 120 may be disposed on one surface 110a or the other surface 110b of the light guide unit 110.

The second diffractive optical element 130 may be disposed in a region distinct from the region where the first diffractive optical element 120 is disposed on the one surface 110a or the other surface 110b of the light guide unit 110.

In the region where the second diffractive optical element 130 is disposed, a region, where virtual first linear patterns L1 repeatedly arranged at a predetermined pitch along a first direction and virtual second linear patterns L2 repeatedly arranged at a predetermined pitch along a second direction different from the first direction intersect each other, may be defined. The first direction may be defined as a direction perpendicular to the direction in which the first linear patterns L1 are extended, and the second direction may be defined as a direction perpendicular to the direction in which the second linear patterns L2 are extended.

The first diffractive optical element 120 may include a one-dimensional pattern as the linear gratings 121 and the second diffractive optical element 130 may include two-dimensional patterns 131 provided in the intersection region. The two-dimensional patterns 131 may be protruding patterns protruding from the one surface 110a or the other surface 110b of the light guide unit 110 or concave patterns recessed therein. In the present embodiment, the two-dimensional pattern 131 will be mainly described as being the protruding pattern.

Since the two-dimensional patterns 131 are provided in the intersection region where the first linear patterns L1 and the second linear patterns L2 intersect each other, the two-dimensional patterns 131 may constitute first gratings L1' parallel to the first linear patterns L1 and simultaneously constitute second gratings L2' parallel to the second linear patterns L2.

The first gratings L1' may be configured to receive the lights from the first diffractive optical element 120 and to allow the received lights to be directed to the different types of gratings (second gratings L2') by diffraction, and the second gratings L2' may be configured to receive the lights from the first diffractive optical element 120 and to allow the received lights to be directed to the different types of gratings (first gratings L1') by diffraction. Furthermore, each of the first gratings L1' and the second gratings L2' may be configured to receive the diffracted lights from the first diffractive optical element 120 and to allow the received lights to be extended in one dimension by diffraction. A part of the diffracted lights received from the first diffractive optical element 120 may be diffracted by passing through the first gratings L1' and/or the second gratings L2' and thus have an optical path changed, and the rest thereof may be totally reflected to an existing optical path. Here, the light initially received from the first diffractive optical element 120 may be divided into a plurality of beams while being diffracted a plurality of times at a point spaced in a specific direction, and eventually extended in one dimension.

The first gratings L1' may be configured to receive the extended lights from the different types of gratings (second gratings L2') and to allow the received light to be output from the light guide unit 110 by diffraction, and the second gratings L2' may be configured to receive the extended lights from the different types of gratings (first gratings L1') and to allow the received light to be output from the light guide unit 110 by diffraction. Furthermore, the first gratings L1' may receive the extended lights from the different types of gratings L2' and extend the received lights in one dimension by diffraction, and the second gratings L2' may receive the extended light from the different types of gratings (first gratings L1') and extend the received lights in one dimension by diffraction. In such a case, the direction, in which the plurality of beams formed by the lights received from the first diffractive optical element 120 and extended by the first gratings L1' and/or the second gratings L2' are spaced apart from each other, intersects the direction in which a plurality of beams received from the different types of gratings (second gratings L2' and first gratings L1') and extended by the first gratings L1' and/or the second gratings L2' are spaced apart from each other. Therefore, the lights output by the plurality of beams extended by the first gratings L1' and the second gratings L2' may be treated as being two-dimensionally extended based on the lights received by the first diffractive optical element 120 from the light source.

The linear gratings 121 and the linear patterns (first linear pattern L1 and second linear pattern L2) may have grating vectors V1 to V3, respectively, which are defined by 'sizes' inversely proportional to respective pitches P1 to P3 thereof and a 'direction' perpendicular to a direction in which the linear gratings are extended. The linear patterns (first linear pattern L1 and second linear pattern L2) may be replaced with the gratings (first gratings L1' and second gratings L2'), respectively. The sizes of the grating vectors V1 to V3 may be defined by Equation 1 below.

$$|V| = \frac{2\pi}{P} \qquad \text{Equation 1}$$

In Equation 1 above, |V| denotes the size of the grating vector and P denotes the pitch of the linear grating, the linear pattern, and/or the gratings.

The sum of the grating vectors V1 to V3 of the linear grating 121 of the first diffractive optical element 120 and the first linear patterns L1 and the second linear patterns L2 of the second diffractive optical element 130 has a value of 0. Similarly, the sum of the grating vectors V1 to V3 of the linear grating 121 of the first diffractive optical element 120 and the first grating L1' and the second grating L2' of the second diffractive optical element 130 has a value of 0.

In such a case, preferably, the grating vectors V1 to V3 of the linear grating 121 of the first diffractive optical element 120 and the first linear patterns L1 and the second linear patterns L2 of the second diffractive optical element 130 have the same size and form an angle of 60° therebetween. This is because it is possible to form all of the diffractive optical elements 120 and 130 by one mold having grating patterns with the same pitch.

As an embodiment, the first diffractive optical element 120 may have the linear grating 121 that forms an angle of 90° with respect to a horizontal line H parallel to an x axis as illustrated in FIG. 7a. The second diffractive optical element 130 may have the first linear pattern L1 and/or the first grating L1' that forms an angle of −30° with respect to the horizontal line H parallel to the x axis as illustrated in FIG. 7b and the second linear pattern L2 and/or the second grating L2' that forms an angle of +30° with respect to the horizontal line H parallel to the x axis as illustrated in FIG. 7c. Since the respective pitches P1 to P3 are all the same, the sizes of the respective grating vectors V1 to V3 are all the same. The directions of the grating vectors V1 to V3 are perpendicular to the direction in which the respective linear gratings, linear patterns, and gratings are extended. Thus, the direction of the grating vector V1 of the linear grating 121 of the first diffractive optical element 120 may be parallel to the x-axis direction. The direction of the grating vector V2 of the first linear pattern L1 and/or the first grating L1' of the second diffractive optical element 130 may form an angle of −120° with respect to the x-axis direction, and the direction of the grating vector V3 of the second linear pattern L2 and/or the second grating L2' of the second diffractive optical element 130 may form an angle of +120° with respect to the x-axis direction. As a consequence, the respective grating vectors V1 to V3 of the linear grating 121 of the first diffractive optical element 120 and the first linear pattern L1 and the second linear pattern L2 of the second diffractive optical element 130 form an angle of 60° therebetween and the sum of the respective grating vectors V1 to V3 has a value of 0. In addition, the respective grating vectors V1 to V3 of the linear grating 121 of the first diffractive optical element 120 and the first grating L1' and the second grating L2' of the second diffractive optical element 130 form an angle of 60° therebetween and the sum of the respective grating vectors V1 to V3 has a value of 0.

Meanwhile, in the region where the second diffractive optical element 130 is disposed, since lights are output through the light guide unit 110 by diffraction, it is necessary to determine the shape of a two-dimensional pattern capable of uniformly guiding the amount of the output lights over the region where the second diffractive optical element 130 is disposed.

FIGS. 9a to 9k are views illustrating uniformity of light amount distribution based on simulation results of lights output according to the horizontal and vertical lengths and the protruding height of a two-dimensional pattern in a predetermined region of the second diffractive optical element.

The uniformity of the light amount distribution may be defined as Equation 2 below.

$$U = 1 - ((I_{max} - I_{min})/(I_{max} + I_{min}))$$ Equation 2

In Equation 2 above, U denotes the uniformity of the light amount distribution in the predetermined region, $I_{max}$ denotes the highest light amount per unit area in the predetermined region, and $I_{min}$ denotes the lowest light amount per unit area in the predetermined region. The unit of I is $(V/m)^2$.

A horizontal length Lx of the two-dimensional patterns 131 refers to a length in a direction approximately perpendicular to the extension direction of the linear grating 121 included in the first diffractive optical element 120, and a vertical length Ly of the two-dimensional patterns 131 refers to a length in a direction approximately parallel to the extension direction of the linear grating 121 included in the first diffractive optical element 120. The meaning of being approximately perpendicular or parallel to a predetermined direction means being substantially perpendicular or parallel to the predetermined direction, preferably, means forming an angle of 20° or less with the predetermined direction, and more preferably, means forming an angle of 5° or less with the predetermined direction.

FIG. 9a illustrates the uniformity of the light amount distribution when the protruding height of the two-dimensional pattern 131 is 40 nm, and FIG. 9k illustrates the uniformity of the light amount distribution when the protruding height of the two-dimensional pattern 131 is 90 nm by increasing the protruding height of the two-dimensional pattern 131 by 5 nm starting from FIG. 9b.

The wavelength of the light used in the present simulation is 532 nm and the pitch of the linear grating, the linear pattern, and/or the gratings is 365 nm.

In general, when the vertical length Ly of the two-dimensional pattern 131 is longer than the horizontal length Lx thereof and when the vertical length Ly and the horizontal length Lx are the same, the uniformity of the light amount distribution was close to 0.

When the horizontal length Lx of the two-dimensional pattern 131 is longer than the vertical length Ly thereof, the uniformity of the light amount distribution was formed higher than in other shapes, and the uniformity of the light amount distribution varies depending on the degrees of the horizontal length Lx and the vertical length Ly, but when the horizontal length Lx is 420 nm, the uniformity of the light amount distribution was generally higher than in other cases.

When the protruding height of the two-dimensional pattern 131 is 40 nm, since the uniformity of the light amount distribution was converged to 0 regardless of the degrees of the horizontal length Lx and the vertical length Ly, it is possible to derive that the protruding height of the two-dimensional pattern 131 needs to be equal to or more than a predetermined height.

Referring to the results illustrated in FIGS. 9a to 9k, when the protruding height of the two-dimensional pattern 131 is 45 nm to 60 nm, it is confirmed that many combinations of the vertical length Ly and the horizontal length Lx of the two-dimensional pattern 131, in which the uniformity of the light amount distribution is 0.4 or more, are derived. When the uniformity of the light amount distribution is the same, it is general that the protruding height of the two-dimensional pattern is proportional to the wavelength of light used.

Since the wavelength of the light used in the present simulation is 532 nm, it is preferred that the protruding height of the two-dimensional pattern is 0.084 times to 0.113 times the wavelength of the used light, in order to obtain the result that the uniformity of the light amount distribution is 0.4 or more.

Furthermore, referring to the results illustrated in FIGS. 9a to 9k, when the vertical length Ly of the two-dimensional pattern 131 is 189 nm to 336 nm, it is confirmed that many combinations of the vertical length Ly and the horizontal length Lx of the two-dimensional pattern 131, in which the uniformity of the light amount distribution is 0.4 or more, are derived.

Since the pitch of the linear grating, the linear pattern, and/or the gratings used in the present simulation is 365 nm, it is preferred that the vertical length Ly of the two-dimensional pattern is 0.50 times to 0.921 times the pitch of the linear grating, the linear pattern, and/or the gratings, in order to obtain the result that the uniformity of the light amount distribution is 0.4 or more.

Furthermore, referring to the results illustrated in FIGS. 9a to 9k, when the horizontal length Lx of the two-dimensional pattern 131 is 420 nm to 483 nm, it is confirmed that many combinations of the vertical length Ly and the horizontal length Lx of the two-dimensional pattern 131, in which the uniformity of the light amount distribution is 0.4 or more, are derived.

Since the pitch of the linear grating, the linear pattern, and/or the gratings used in the present simulation is 365 nm, it is preferred that the horizontal length Lx of the two-dimensional pattern is 0.150 times to 1.324 times the pitch of the linear grating, the linear pattern, and/or the gratings, in order to obtain the result that the uniformity of the light amount distribution is 0.4 or more.

Meanwhile, FIG. 9c illustrates the uniformity of the light amount distribution when the protruding height of the two-dimensional pattern 131 is 50 nm and a part corresponding to the horizontal length Lx of the two-dimensional pattern 131 forms 90° with respect to the extension direction of the linear grating 121 included in the first diffractive optical element 120. FIG. 9l illustrates the uniformity of the light amount distribution when the part corresponding to the horizontal length Lx of the two-dimensional pattern 131 has rotated by 10° in the counterclockwise direction based on a direction perpendicular to the extension direction of the linear grating 121 included in the first diffractive optical element 120, as compared to FIG. 9c. FIG. 9m illustrates the uniformity of the light amount distribution when the part corresponding to the horizontal length Lx of the two-dimensional pattern 131 has rotated by 18° in the counterclockwise direction based on the direction perpendicular to the extension direction of the linear grating 121 included in the first diffractive optical element 120, as compared to FIG. 9c. FIG. 9n illustrates the uniformity of the light amount distribution when the part corresponding to the horizontal length Lx of the two-dimensional pattern 131 has rotated by 20° in the counterclockwise direction based on the direction perpendicular to the extension direction of the linear grating 121 included in the first diffractive optical element 120, as compared to FIG. 9c.

Referring to FIG. 9c, FIG. 9l, and FIG. 9m, when the part corresponding to the horizontal length Lx of the two-dimensional pattern 131 is perpendicular to the extension direction of the linear grating 121 included in the first diffractive optical element 120 or the part corresponding to the horizontal length Lx of the two-dimensional pattern 131 has rotated by less than 20° based on the direction perpendicular to the extension direction of the linear grating 121 included in the first diffractive optical element 120, the uniformity of the light amount distribution can be achieved in excess of 0.

In summary, in order to uniformly output light throughout the region where the second diffractive optical element 130 is disposed, it is preferred that the horizontal section of the two-dimensional pattern 131 has an elliptical shape and the long axis of the elliptical shape forms an angle of less than 20° based on the direction perpendicular to the extension direction of the linear grating 121 included in the first diffractive optical element 120.

A display device (not illustrated) according to another aspect of the present disclosure may include a light source (not illustrated) that outputs an image light that forms an image and the diffractive light guide plate 100 according to an aspect of the present disclosure. The image light output from the light source may be input to and diffracted by the first diffractive optical element 120, are coupled to the first grating L1' and the second grating L2' of the second diffractive optical element 130. The first grating L1' and the second grating L2' may be coupled to diffract the received light to extend the light in one dimension, and the light extended in one dimension may be coupled to the other types of gratings L2' and L1' and output from the light guide unit 110 by diffraction. The light received from the first diffractive optical element 120 is extended and the extended image light is output by each of the first grating L1' and the second grating L2' each composed of the two-dimensional pattern disposed over the entire region of the second diffractive optical element 130. Thus, it is possible to form a wide viewing angle and a wide eye motion box, thereby extensively respondable to pupils of users with various physical conditions.

FIG. 10a is an image obtained by capturing a light output from the second diffractive optical element of an embodiment of the diffractive light guide plate according to an aspect of the present disclosure, and FIG. 10b is an image obtained by capturing a light output from a second diffractive optical element of a comparative example of a diffractive light guide plate having a circular horizontal section of a two-dimensional pattern.

It can be seen that while the light output from the second diffractive optical element of the comparative example is output in the left and right direction rather than the vertical direction, the light output from the second diffractive optical element of the embodiment of the present disclosure is distributed in the vertical direction as well as the left and right direction and is uniformly output.

Although the present disclosure has been described in relation to the preferred embodiment described above, various corrections or modifications can be made without departing from the subject matter and scope of the disclosure. Therefore, the appended claims will include such corrections or modifications as long as they belong to the subject matter of the present disclosure.

DESCRIPTION OF REFERENCE NUMERALS

100: diffractive light guide plate
110: light guide unit
120: first diffractive optical element
121: linear gratings
130: second diffractive optical element
131: two-dimensional patterns
L1: first linear patterns
L2: second linear patterns
L1': first gratings
L2': second gratings

The invention claimed is:
1. A diffractive light guide plate comprising:
a light guide unit configured to guide lights;
a first diffractive optical element including a linear grating repeatedly formed at a predetermined pitch such that lights output from a light source are received and guided on the light guide unit, and configured to diffract the received lights; and a second diffractive optical element disposed in a region distinct from a region where the first diffractive optical element is disposed on one surface of the light guide unit, and including a two-dimensional pattern provided in a region where a virtual first linear pattern repeatedly arranged at a predetermined pitch along a first direction and a virtual second linear pattern repeatedly arranged at a predetermined pitch along a second direction different from the first direction intersect each other, wherein a horizontal section of the two-dimensional pattern has an elliptical shape and an angle formed between the long axis of the elliptical shape and a direction perpendicular to an extension direction of the linear grating included in the first diffractive optical element is 10° or more but less than 18°, wherein the two-dimensional pattern protrudes from the one surface of the light guide unit, and wherein a protruding height of the two-dimensional pattern is 0.084 times to 0.113 times a wavelength of the light output from the light source.

2. The diffractive light guide plate according to claim 1, wherein the short axis of the elliptical shape is 0.50 times to 0.921 times the pitch of the linear grating, the first linear pattern and the second linear pattern.

3. The diffractive light guide plate according to claim 1, wherein the long axis of the elliptical shape is 0.150 times to 1.324 times the pitch of the linear grating, the first linear pattern and the second linear pattern.

4. The diffractive light guide plate according to claim 1, wherein each of the linear grating, the first linear pattern and the second linear pattern has a grating vector defined by a size inversely proportional to each pitch thereof and a direction perpendicular to a direction in which the linear grating, the first linear pattern and the second linear pattern are extended, and a sum of grating vectors of the linear grating of the first diffractive optical element and the first linear pattern and the second linear pattern of the second diffractive optical element has a value of 0.

5. The diffractive light guide plate according to claim 4, wherein the grating vectors of the linear grating of the first diffractive optical element and the first linear pattern and the second linear pattern of the second diffractive optical element have the same size.

6. The diffractive light guide plate according to claim 4, wherein the grating vectors of the linear grating of the first diffractive optical element and the first linear pattern and the second linear pattern of the second diffractive optical element form an angle of 60° therebetween.

7. A display device comprising:
a light source configured to output an image light that forms an image; and
the diffractive light guide plate according to claim 1.

* * * * *